UNITED STATES PATENT OFFICE 2,232,162

PROCESS OF PRODUCING AN ALKALI-METAL SILICATE-CLAY ADHESIVE

Ernest R. Boller, Cleveland Heights, Ohio, assignor to E. I. du Pont de Nemours & Company, Wilmington, Del., a corporation of Delaware No Drawing. Application May 26, 1939, Serial No. 275,803

6 Claims. (Cl. 134—23.92)

This invention relates to processes for making a stable suspension of china clay in a silicate solution according to which the china clay is first dispersed in water by means of agitation and then the china clay dispersion is added to and admixed with a silicate solution.

Clay is frequently added to sodium silicate adhesives to increase their viscosity and to improve their adhesive characteristics so that they will be better adapted for application to paper as on laminated paper board and corrugated board machines.

When clay is used with a relatively concentrated sodium silicate solution, say 42.5° Bé., a fairly stable suspension is obtained by simple mixing. But when an attempt is made to suspend clay in more dilute sodium silicate solutions unstable suspensions are obtained from which the clay settles out very rapidly.

The rapid settling of clay from dilute silicate solutions makes dilute silicate-clay adhesives difficult to transport and use. Clay settles in tank cars and pipe lines and also forms a sediment in paper board machines. In addition to the mechanical difficulties caused by the separation of clay, there is the further problem caused by the variation in adhesive composition. The separation of clay from the adhesive during use requires frequent readjustment of the paper board equipment.

In the Thickens Patent 1,377,739 it was proposed to make more stable silicate-clay adhesives by prolonged agitation of the clay with a concentrated silicate in which the clay forms a relatively stable dispersion. After a stable dispersion was obtained, it was proposed that water then be added to bring the adhesive to the desired concentration. This procedure was proposed mostly for use with compositions containing a very large amount of clay. Even with compositions containing a large amount of clay these processes according to which clay is agitated with a silicate solution do not produce entirely satisfactory adhesives.

It has also been proposed to prepare various coating compositions and even adhesives which are moderately stable by reason of their containing only a relatively small amount of sodium silicate. These are usually thick and relatively viscous and they contain large amounts of fillers such as clay or starch or inert ingredients. With these coating compositions containing only relatively small amounts of sodium silicate the art has not been faced with the problem of making a stable mixture of a relatively small amount of clay with dilute silicate adhesives particularly adapted for use in corrugated board machines.

I have found that satisfactory, stable silicate-clay adhesives may be prepared with dilute silicate and small amounts of clay by first dispersing the clay in water and then admixing the clay dispersion with the sodium silicate. Silicate adhesives thus prepared according to my invention are ideally adapted for use in the manufacture of laminated paper board and corrugated paper board. The clay has a greatly diminished tendency to settle from the solutions despite their relatively low viscosity and the adhesives do not show the pronounced tendency for the separation of clay which has heretofore made adhesives of this type extremely difficult to use.

The agitation by means of which suspension of clay in water is secured may be effected by any suitable apparatus. The mixture of clay and water may be worked in an edge runner mill, a colloid mill, or similar device for effecting dispersion. It is sufficient simply to use a high-speed mixer.

The suspension of clay in water may be aided by the use of dispersing or deflocculating agents if desired though this is not necessary. It is frequently found convenient, for instance, to employ a small amount of silicate of soda to aid in forming the suspension. Other such alkaline deflocculating agents such as trisodium phosphate and borax may likewise be used.

Various sodium silicate solutions may be used according to my invention. In general, it is preferred that the silicate have an $SiO_2/Na_2O$ weight ratio of about 3.25 but this may be varied according to the practice known to the trade.

The silicate solutions in which clay is suspended according to my invention may also vary widely as to their specific gravity and it will generally be desired to use solutions having a viscosity corresponding to that of a 3.25 ratio silicate solution having a gravity of from about 30 to 41° Bé. More specifically, the advantages of my invention will be most apparent with solutions with a viscosity corresponding to that of a 3.25 ratio silicate solution having a gravity not substantially greater than about 40° Bé.

The amount of china clay used will depend upon the character of the adhesive desired in accordance with the practice known to the art. In general, the advantages of my invention are best obtained with silicate-clay adhesives which contain between about five to fifteen per cent by weight of china clay.

Processes for the preparation of stable silicate-clay adhesives according to this invention must be carefully carried out according to the teachings of my invention if satisfactory adhesives are to be produced. The clay must be suspended with or without a deflocculating agent in a measured amount of water. The amount of water must be taken into account in considering the final strength of the silicate solution above mentioned. The clay dispersion after preparation must be added to a silicate solution with stirring. It is to be observed that it is not satisfactory to add the silicate solution to the clay suspension for when this is done a very thick and sometimes almost solid mass results as the first additions of silicate are made, and it is difficult to finish the preparation of the adhesive.

Small amounts of starch or of other inerts may be present in the silicate-clay adhesives of this invention but it is desirable that no more than about five per cent of such an inert be present.

My invention may be better understood by reference to the following illustrative examples.

Example I

The amount of water, clay and 42.5° Bé. sodium silicate required finally to produce an adhesive composition containing fifteen parts of clay and eighty-two parts of 30.0° Bé. sodium silicate solution was determined. To the water was added one per cent of the total 42.5° Bé. silicate solution required and the required amount of clay was dispersed in the solution by means of agitation with a high-speed mixer for fifteen minutes.

The mixer used had two three-bladed propellers the blades being about three inches long. The propellers were driven at 1800 R. P. M. The mixing was effected in a 110-gallon steel drum.

The suspension of china clay in water was added to the 42.5° Bé. silicate solution, 3.25 ratio, and the mixture was stirred to insure homogeneity.

The silicate-clay adhesive so produced showed only a little settling and no sediment was deposited upon standing.

Example II

The amount of china clay, water, and 42.5° Bé. silicate solution required finally to produce an adhesive composition containing ten per cent clay and ninety per cent 39.5° Bé. silicate was determined and the required amount of clay was added to the water.

The mixture of clay with water was passed through an attrition mill after which there was obtained a suspension so thick that it would barely flow. The mill employed was of the type known as an edge runner paint mill.

The suspension of clay in water was then added to the required amount of 42.5° Bé. silicate. The mixture was made homogeneous by stirring. The silicate solution used had an $SiO_2/Na_2O$ ratio of 3.25.

The silicate-clay adhesive produced showed no sedimentation upon standing and there was only a little settling. When a column of the adhesive was permitted to stand for twenty-four hours there was a clear, supernatant layer somewhat less than ten per cent of the total height of the column.

While I have shown a number of illustrative examples it will be understood that those skilled in the art may suspend china clay in water and then admix with a silicate solution to make dilute silicate-clay adhesives in various ways without departing from the spirit of my invention.

I claim:

1. In a process for the production of an alkali metal silicate-clay adhesive, the step comprising agitating china clay in an amount equivalent to about five to fifteen per cent by weight of the adhesive with water to make a suspension and then adding the suspension to a silicate solution, the silicate solution being used in such an amount that the viscosity of the silicate solution comprising the adhesive would correspond to the viscosity of a 3.25 ratio silicate solution having a gravity not substantially greater than about 40° Bé.

2. In a process for the production of an alkali metal silicate-china clay adhesive which in addition to the china clay contains no more than about five per cent of inerts the balance being substantially silicate solution, the step comprising agitating china clay in an amount equivalent to about five to fifteen per cent by weight of the adhesive with water to make a suspension and then adding the suspension to a silicate solution, the silicate solution being used in such an amount that the viscosity of the silicate solution comprising the adhesive would correspond to the viscosity of a 3.25 ratio silicate solution having a gravity not substantially greater than about 38° Bé.

3. An alkali metal silicate-china clay adhesive comprising from about five to fifteen per cent of china clay and no more than about five per cent of additional inerts, the balance of the composition being a silicate solution with a viscosity corresponding to that of a 3.25 ratio silicate solution having a gravity of about 30 to 41° Bé., the adhesive being relatively stable by reason of the china clay first being suspended in water and then added to the silicate solution.

4. In a process for the production of an alkali metal silicate-clay adhesive, the steps comprising agitating china clay in an amount equivalent to about five to fifteen per cent by weight of the adhesive with water to make a suspension and then adding the clay suspension to a silicate solution, the silicate solution being used in such an amount that the viscosity of the silicate solution comprising the adhesive would correspond to the viscosity of a 3.25 ratio silicate having a gravity from about 30° to 41° Baumé.

5. In a process for the production of an alkali metal silicate-clay adhesive, the steps comprising agitating china clay in an amount equivalent to about five to fifteen per cent by weight of the adhesive with water and a deflocculating agent to make a suspension and then adding the clay suspension to a silicate solution, the silicate solution being used in such an amount that the viscosity of the silicate solution comprising the adhesive would correspond to the viscosity of a 3.25 ratio silicate having a gravity from about 30° to 41° Baumé.

6. In a process for the production of an alkali metal silicate-clay adhesive, the steps comprising agitating china clay in an amount equivalent to about five to fifteen per cent by weight of the adhesive with water and a small amount of trisodium phosphate to make a suspension and then adding the clay suspension to a silicate solution, the silicate solution being used in such an amount that the viscosity of the silicate solution comprising the adhesive would correspond to the viscosity of a 3.25 ratio silicate having a gravity from about 30° to 41° Baumé.

ERNEST R. BOLLER.